No. 774,651. PATENTED NOV. 8, 1904.
E. DENEGRE.
DUST GUARD.
APPLICATION FILED JAN. 7, 1904.
NO MODEL.
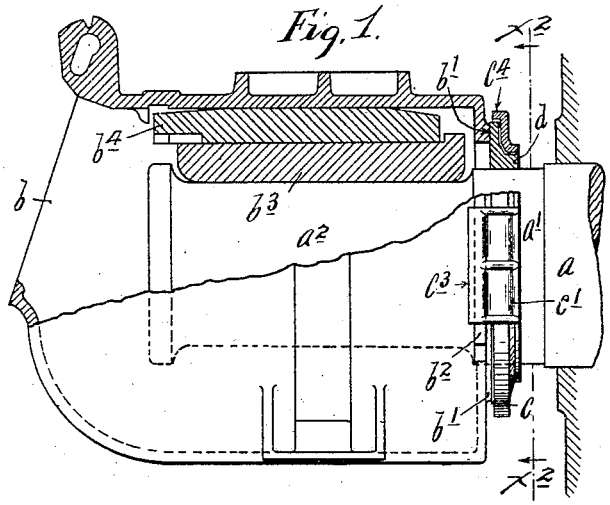
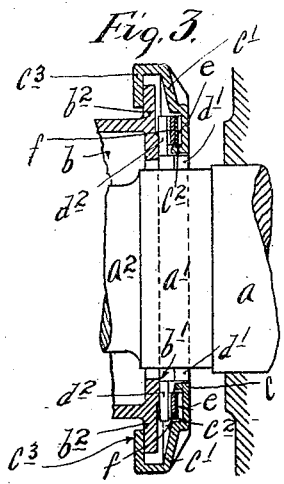
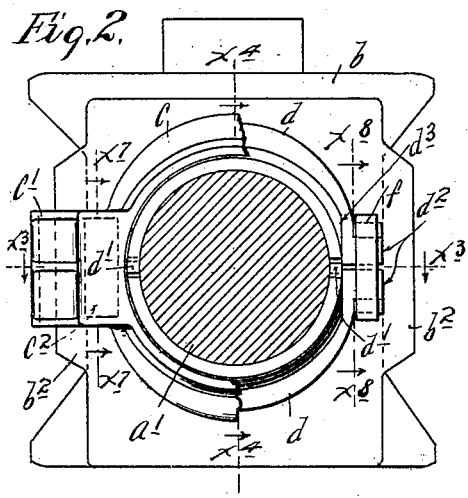
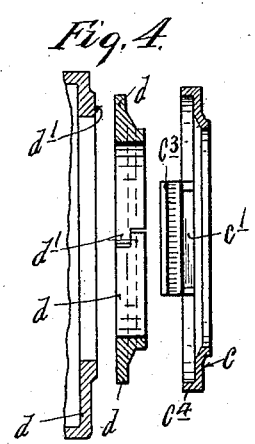
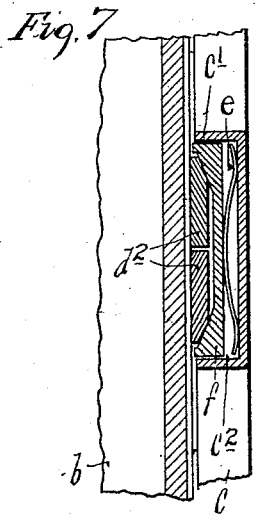
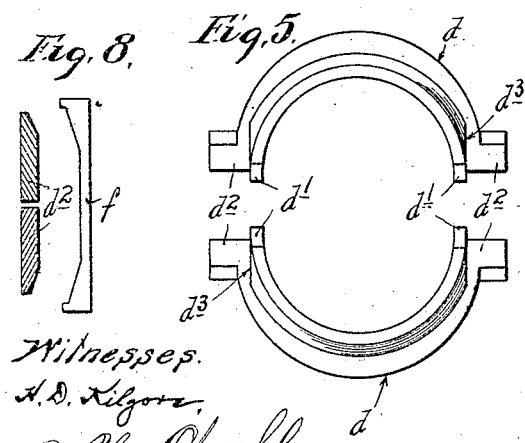
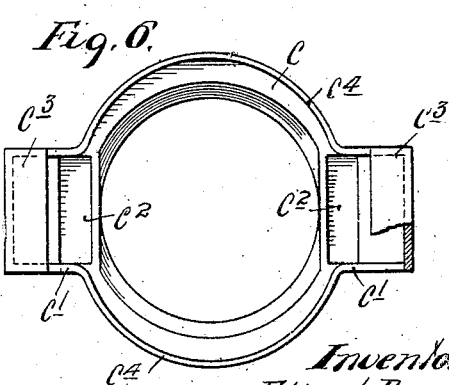
Witnesses.
H. D. Kilgore.
A. H. Opsahl.
Inventor.
Edward Denegre,
By his Attorneys.
Williamson Merchant No. 774,651.

Patented November 8, 1904.

UNITED STATES PATENT OFFICE.

EDWARD DENEGRE, OF CHICAGO, ILLINOIS, ASSIGNOR TO McCORD & COMPANY, OF CHICAGO, ILLINOIS, A CORPORATION OF NEW JERSEY.

DUST-GUARD.

SPECIFICATION forming part of Letters Patent No. 774,651, dated November 8, 1904.

Application filed January 7, 1904. Serial No. 188,039. (No model.)

*To all whom it may concern:*

Be it known that I, EDWARD DENEGRE, a citizen of the United States, residing at Chicago, in the county of Cook and State of Illinois, have invented certain new and useful Improvements in Dust-Guards; and I do hereby declare the following to be a full, clear, and exact description of the invention, such as will enable others skilled in the art to which it appertains to make and use the same.

My invention has for its object to provide an improved dust-guard for car-axle boxes; and to this end the invention consists of the novel devices and combinations of devices hereinafter described, and defined in the claims.

The invention is illustrated in the accompanying drawings, wherein like notations refer to like parts throughout the several views.

In said drawings, Figure 1 is a view, chiefly in elevation, but partly in section, with some portions broken away and other parts removed, illustrating my improved dust-guard in working position. Fig. 2 is a cross-section on the line $x^2 x^2$ of Fig. 1. Fig. 3 is a horizontal section on the line $x^3 x^3$ of Fig. 2, some parts being broken away. Fig. 4 is a sectional view on the line $x^4 x^4$ of Fig. 2, showing a portion of the box with the guard-plate and packing-ring separated therefrom and pulled apart from each other. Fig. 5 is a view showing the sectional packing-ring in elevation, detached, and the parts of the ring separated from each other. Fig. 6 is a view showing the guard-plate detached in inside elevation with the springs removed and a portion of one of the hooks broken away. Fig. 7 is an enlarged detail, in vertical section, on the line $x^7 x^7$ of Fig. 2; and Fig. 8 is a detail in vertical section on the line $x^8 x^8$ of Fig. 2, showing cam-surfaces or cam-lugs on the packing-ring and one of the cam-blocks separated from the ring.

The reference-letters $a\ a'\ a^2$ represent parts of the axle, the portion $a$ being the body of the axle, $a^2$ the journal, and $a'$ the intermediate part subject to the dust-guard.

The box $b$ may be of the ordinary or any suitable construction and is provided on its rear end face with a raised boss $b'$, surrounding the opening or axle-passage at the rear end of the box, which boss $b'$ has a machine $d$ or planed face and serves as the box-surface to be packed. Said box $b$ is also provided on its rear end with lock-flanges $b^2$.

The reference-letters $b^3$ and $b^4$ represent the brass and key of the ordinary standard form applied in the usual way.

The guard-plate is solid or integral, being made up of the body portion $c$ and the lateral extensions or ear-lugs $c'$, which are recessed to afford spring seats or pockets $c^2$, as best shown in Figs. 2, 3, 6, and 7, and which ear-lugs $c'$ are provided with rigid hook-like extensions $c^3$ for engagement with the lock-flanges $b^2$ on the box, as best shown in Figs. 2 and 3. Said guard-plate has the customary central opening for passing the axle, and intermediate the said lateral extensions or ear-lugs $c'$ said guard-plate is provided with segmental peripheral flanges $c^4$, which embrace or encircle the periphery of the packing-ring $d$.

The packing-ring $d$ is of sectional form, being shown as made up of two sections or half-circle segments with lap-joints $d'$ and laterally-extended cam-lugs $d^2$, as best shown in Figs. 5, 7, and 8. The hub portion of the packing-ring $d$ fits the opening in the guard-plate, and the radially-expanded portion of the packing-ring rests within the body of the guard-plate, as best shown in Figs. 1, 2, and 3. The cam-lugs $d^2$ on the packing-ring $d$ when in working position directly underlie the pockets $c^2$ in the ear-lugs $c'$ of the guard-plate.

Half-elliptic springs $e$ and cam-blocks $f$ are located in the said pockets $c^2$ of the guard-plate with the cam-surfaces of the blocks $f$ in contact with the cam-surfaces on the cam-lugs $d^2$ of the packing-ring and the springs $e$ located between the cam-blocks $f$ and the guard-plate. The springs $e$ are applied under compression, being set under compression by the act of applying the dust-guard to the box. Otherwise stated, when the hook-like lugs $c^3$ of the guard-plate are made to engage with the lock-flanges $b^2$ of the box the springs $e$ are thereby compressed, and the said springs will coöperate with the cam-blocks $f$ and the cam-lugs $d^2$ on the packing-ring yieldingly to clamp the dust-guard to the box and to hold the said sectional packing-ring $d$ always tightly hugging the box-surface and the axle-surface to be packed thereby. Otherwise stated, the cam-blocks $f$ and the cam-lugs $d^2$ on the packing-ring coöperate under the pressure from the springs $e$ to force the ring against the raised boss $b'$ of the box and at the same time to force the two sections of the packing-ring toward each other as far as permitted by the axle embraced thereby. Hence as the sections of the packing-ring wear away under the service they will simply be forced closer together, thereby always tightly hugging the axle-surface packed thereby, while the face of the packing-ring will always be kept tightly pressed against the box-surface $b'$ packed thereby. With this simple construction, therefore, the sectional packing-ring is always held in proper packing position both in respect to the box and in respect to the axle, while at the same time the entire dust-guard is free to move with the axle in respect to the box, and the springs $e$ are of such strength that when under the compression required to interlock the dust-guard with the box the weight of the entire dust-guard will be carried by the box from the friction afforded under the clamping action from the said springs. Hence the axle is free from the load of all the parts of the dust-guard, while, nevertheless, the dust-guard will move in respect to the box, as required under the motions incidental to the service.

The packing-ring $d$ is cut away, as shown at $d^3$, to afford the requisite clearance for the cam-blocks $f$ to coöperate with the cam-lugs $d^2$ of the ring.

The packing-ring $d$ is preferably composed of gray iron, as practice has shown that to be the best material for the purpose; but it will be understood, of course, that any other suitable material may be used.

With the dust-guard above described, it must be obvious that none of the parts are exposed where they can readily be tampered with or where they would be liable to become displaced and lost. The cam-blocks $f$ and the springs $e$ are securely held within the pockets $c^2$ of the guard-plate, and the packing-ring is held by the guard-plate when all the parts are in working position. It should also be noted that the cam-blocks $f$ and the springs $e$ move together with the guard-plate and the packing-ring, and hence it follows that there is no sliding wear and tear on the springs.

The shown position of the springs and the shown forms of the cam-surfaces through which the springs deliver their tension on the packing-ring are not absolutely essential. Otherwise stated, the dust-guard herein disclosed involves an important new principle capable of considerable modification in construction—to wit, springs and cam-surfaces so applied that the dust-guard is yieldingly clamped to the box and that the tension from the springs is delivered to the sectional packing-ring both in an axial and in a radial direction.

The shown location and the shown form of the cam-surfaces, including the separate cam-blocks $f$, constitute the preferred construction or embodiment of the principle. An obvious modification, however, can be seen on the face of the same drawings. Let it be noted that the packing-ring $d$ has a beveled surface on its hub which is fitted by a corresponding beveled surface of the guard-plate $c$ when the parts are in working position, as will readily be understood from an inspection of Figs. 1 and 4, and hence it follows that if the half-elliptic springs $e$ should be applied in a modified way—to wit, if they should be located between the hook-lugs $c^3$ of the guard-plate and the lock-flanges $b^2$ of the box—the threefold function of the same springs would still be secured, for the reason that the coöperating beveled surfaces of the ring and the seat for the same in the guard-plate $c$ would serve to deliver the tension from the springs on the sectional packing-ring in both a radial and axial direction. If such modification should be employed, the cam-blocks $f$ would of course be dispensed with and the cam-lugs $d^2$ on the packing-ring would not be needed.

By actual usage the efficiency of the dust-guard herein disclosed, both in the form illustrated and in the modification thereof described, has been fully demonstrated.

What I claim, and desire to secure by Letters Patent of the United States, is as follows:

1. The combination with a journal-box, of a dust-guard comprising a guard-plate having means for engagement with the box, a sectional packing-ring interposed between the guard-plate and the box and serving to pack both the box and the axle, springs yieldingly clamping the dust-guard to the box, and some of the coöperating parts having cam-surfaces constructed and applied to deliver the tension from said springs on the sectional packing-ring both in an axial and in a radial direction, whereby said sectional packing-ring will always be held tightly hugging both the box and the axle surfaces packed thereby, and the guard clamped to the box from the same set of springs, substantially as described.

2. The combination with a journal-box, of a dust-guard comprising a guard-plate having means for engagement with the box, a sectional packing-ring interposed between the guard-plate and the box and serving to pack both the box and the axle, and coöperating cam-blocks and springs interposed between the guard-plate and the packing-ring and serving yieldingly to clamp the dust-guard to the box with the sectional packing-ring always held hugging the box and axle surfaces packed thereby, substantially as described.

3. The combination with a journal-box, of a dust-guard comprising a guard-plate having means for engagement with the box, a sectional packing-ring interposed between the guard-plate and the box and serving to pack both the box and the axle, and provided with cam-surfaces, cam-blocks interposed between said guard-plate and said cam-surfaces on the packing-ring, and springs interposed between said cam-blocks and the guard-plate, which springs, cam-surfaces and cam-blocks coöperate yieldingly to clamp the dust-guard to the box with the sectional packing-ring always held tightly hugging the box and axle surfaces packed thereby, substantially as described.

4. The combination with a journal-box, of a dust-guard comprising a guard-plate having hook-like lugs adapted to engage with flanges on the box, a sectional packing-ring interposed between the guard-plate and the box and serving to pack both the box and the axle, and provided with cam-lugs, cam-blocks interposed between the guard-plate and said cam-lugs on the packing-ring, and half-elliptic springs interposed between the said cam-blocks and the said guard-plate, which cam-lugs, cam-blocks and springs coöperate yieldingly to clamp the dust-guard to the box, with the sectional packing-ring always held tightly hugging the box and the axle surfaces packed thereby, substantially as described.

In testimony whereof I affix my signature in presence of two witnesses.

EDWARD DENEGRE.

Witnesses:
JAMES D. DENEGRE,
H. D. KILGORE.